June 5, 1962    T. E. PLUMMER    3,037,822
ELECTRIC MOTOR BEARING AND RETAINER ASSEMBLY
Filed Feb. 12, 1960

INVENTOR.
Theodore E. Plummer
BY
His Attorney

United States Patent Office 3,037,822
Patented June 5, 1962

3,037,822
ELECTRIC MOTOR BEARING AND
RETAINER ASSEMBLY
Theodore E. Plummer, Rochester, N.Y., assignor to General Motors Corporation, Detroit, Mich., a corporation of Delaware
Filed Feb. 12, 1960, Ser. No. 8,418
7 Claims. (Cl. 308—72)

This invention pertains to bearing assemblies, and particularly to a combined self-aligning bearing and retainer assembly designed for dynamoelectric machines.

Heretofore, it has been the practice to use sintered bronze self-aligned bearings and spring retainers for holding the self-aligning bearings in assembled relation with the motor housings, or frames. A typical electric motor having bearing and retainer constructions of this type is disclosed in the Swarthout Patent 2,629,061. This invention relates to an integral molded bearing and retainer assembly to replace the two-part assembly heretofore used. Accordingly, among my objects are the provision of an integral bearing assembly; the further provision of an integral bearing and retainer assembly composed of graphite impregnated nylon; and the still further provision of an integral bearing and retainer assembly composed of nylon and utilizing a lubricant impregnated wick.

The aforementioned and other objects are accomplished in the present invention by utilizing either a molded or sintered nylon member having an integral annular flange with a plurality of circumferentially spaced radial projections for maintaining the integral bearing and retainer in assembled relation with a motor housing. Specifically, the integral bearing and retainer assembly is designed for use with a motor having a housing, or frame, with a socket in the end wall formed as a spherical seat to receive a self-aligning bearing. One wall of the socket is formed with a plurality of circumferentially spaced slots.

In one embodiment, the integral bearing and retainer comprises graphite impregnated nylon bearing having a spherical outer surface complementary to the spherical seat in the socket of the motor housing. The bearing is formed with an integral flange having a plurality of radially extending projections adapted to extend through the slots in the socket of the housing.

In a second embodiment, the integral bearing and retainer is composed of nylon having an integral annular flange which is spaced from a wall of the socket to accommodate a lubricant impregnated wick. In both embodiments, the spherical bearing is formed by a through bore adapted to journal one end of an armature shaft. The armature shaft carries the usual oil slinger comprising a flanged metal shield for preventing the escape of lubricant from the bearing into the motor windings.

Further objects and advantages of the present invention will be apparent from the following description, reference being had to the accompanying drawing, wherein preferred embodiments of the present invention are clearly shown.

Figure 1:
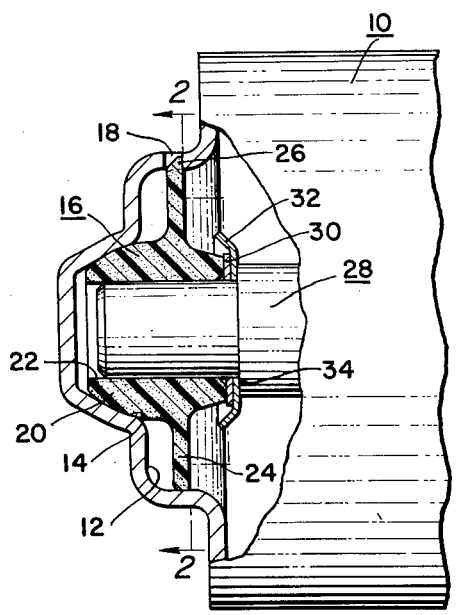
FIGURE 1 is a fragmentary view, partly in section and partly in elevation, of a motor having the combined integral bearing and retainer assembly constructed according to one embodiment of this invention.
Figure 2:
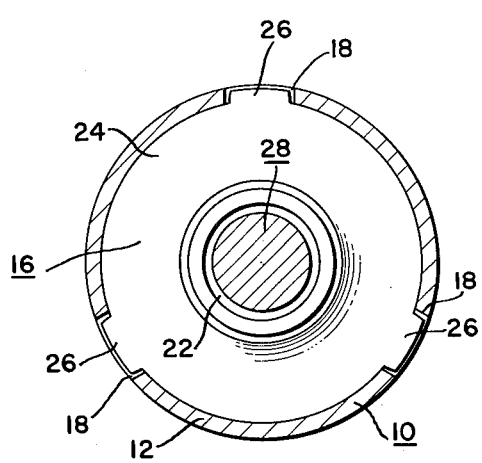
FIGURE 2 is a sectional view taken along line 2—2 of FIGURE 1.

With particular reference to the drawing, the present invention is depicted in conjunction with a motor having a frame, or housing, 10 having a socket 12 in its end wall with a spherical seat 14. The socket 12 is adapted to receive the combined bearing and retainer 16 of this invention. Accordingly, one wall of the socket 12 is formed with three circumferentially spaced notches 18.

In the first embodiment, the integral bearing and retainer comprises either a molded or sintered graphite impregnated nylon member having a self-aligning, frustospherical bearing portion 20 with a through bore 22 and an annular flange 24 with three radially extending, circumferentially spaced projections 26. The radially extending retention flange 24 is axially offset, or spaced, from the bearing portion 20 as clearly seen in FIGURES 1 and 4. One end of an armature shaft 28 is adapted to be journalled in the through bore 22 of the self-aligning bearing 20. A washer 30 and an oil slinger 32 are arranged between the bearing 20 and a shoulder 34 on the shaft 28. The projections 26 engage the slots 18 and retain the bearing in assembled relation with the housing 10.

Figure 3:
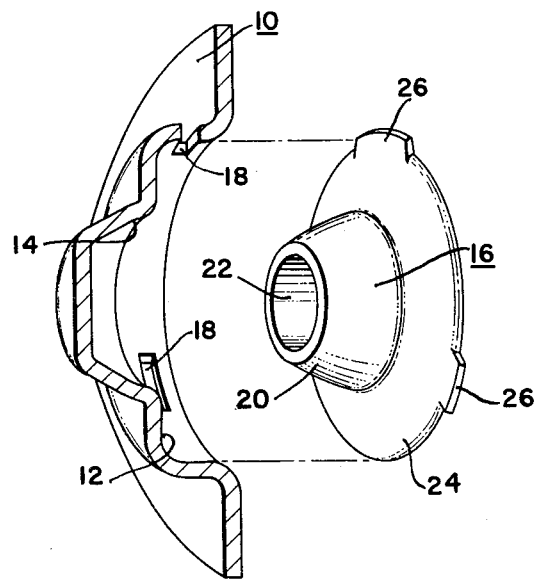
FIGURE 3 is an exploded view, partly in section and partly in elevation, depicting the manner in which the integral bearing and retainer is assembled with the motor housing.

With reference to FIGURE 3, the integral bearing and retainer is assembled with the housing 10 by inserting the assembly 16 into a socket 12. By reason of the assembly 16 being composed of elastomeric material, the projections 26 are sufficiently flexible to permit insertion of the bearing assembly 16 into the socket, and when the bearing assembly 16 is properly aligned with the slots 18 in the socket 12, the projections 26 snap into slots 18 to securely retain the bearing assembly in assembled relation with the housing 10. Moreover, by virtue of the flexibility of the flange 24, the bearing possesses the necessary self-aligning characteristics permitting it to move universally within the spherical seat 14 of the socket 12.

Figure 4:
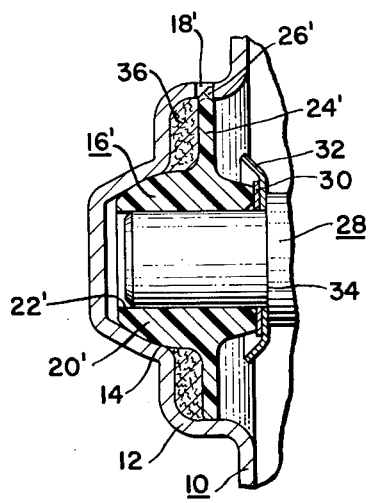
FIGURE 4 is a fragmentary sectional view of an integral bearing and retainer constructed according to a modified embodiment of the present invention.

With reference to FIGURE 4, in a modified embodiment the integral bearing and retainer 16' is composed of either molded or sintered nylon having a bearing portion 20', a through bore 22', a flange 24' and three radial projections 26'. The modified bearing and retainer assembly 16' is held in assembled relation with the housing 10 in the same manner as the embodiment shown in FIGURE 1, wherein the bearing portion 20' engages the spherical seat 14 of the socket 12, and the projections 26' extend into the slots 18 of the socket 12. However, in order to lubricate the journal bearing for the shaft 28, a lubricant impregnated washer 36 of fibrous material is located between the flange 24 and the end wall of the socket 12.

While the embodiments of the invention as herein disclosed constitute preferred forms, it is to be understood that other forms might be adopted.

What is claimed is as follows:

1. The combination with a housing having a socket formed in an end wall thereof with a spherical seat, said socket having a plurality of circumferentially spaced slots in one wall thereof, of an integral self-aligning bearing and retainer composed of plastic material, said integral bearing and retainer having a spherical surface engaging the spherical seat of said socket and a plurality of radial projections extending into said slots.

2. The combination with a housing having a socket in an end wall with a spherical seat and a plurality of slots in one wall of said socket, of an integral self-aligning bearing and retainer composed of plastic material, said integral bearing and retainer having a spherical bearing surface engageable with the spherical seat of said socket and an integral flexible annular flange having a plurality of radial projections extending into the slots in said socket.

3. The combination set forth in claim 2 wherein said integral bearing and retainer is composed of graphite impregnated nylon.

4. The combination set forth in claim 2 wherein said bearing and retainer is composed of nylon, wherein said flange is spaced from the end wall of said socket, and a washer of lubricant impregnated fibrous material positioned between said flange and the end wall of said socket.

5. The combination with a housing having a socket formed in an end wall thereof with a spherical seat, of an integral self-aligning bearing and retainer composed of plastic material, said integral bearing and retainer having a spherical bearing surface engaging said spherical seat and a flexible annular retention flange interlocked with said housing.

6. The combination with a housing having a socket formed in an end wall thereof with a spherical seat, of an integral self-aligning bearing and retainer composed of plastic material, said integral bearing and retainer having a spherical bearing surface engaging said spherical seat and a flexible annular retention flange interlocked with said housing, said retention flange being axially offset from said spherical bearing surface.

7. The combination with a housing having a socket formed in an end wall thereof with a spherical seat, of an integral self-aligning bearing and retainer composed of plastic material, said integral bearing and retainer having a spherical bearing surface engaging said spherical seat and a flexible retention portion interlocked with said housing.

References Cited in the file of this patent

UNITED STATES PATENTS

| | | |
|---|---|---|
| 2,246,086 | Austin | June 17, 1941 |
| 2,702,675 | Leaver | Feb. 22, 1955 |
| 2,814,538 | Connolly | Nov. 26, 1957 |
| 2,878,047 | Booth | Mar. 17, 1959 |
| 2,919,150 | Baker | Dec. 29, 1959 |
| 2,923,579 | Scheel | Feb. 2, 1960 |
| 2,932,081 | Witte | Apr. 12, 1960 |